US 6,295,885 B1

United States Patent
Delsole

(10) Patent No.: US 6,295,885 B1
(45) Date of Patent: Oct. 2, 2001

(54) AUTOMOBILE TRANSMISSION WITH NON-ROTATING REVERSE GEAR

(76) Inventor: Robert Delsole, 86 Valley Rd., Larchmont, NY (US) 10538

( * ) Notice: Subject to any disclaimer, the term of this patent is extended or adjusted under 35 U.S.C. 154(b) by 0 days.

(21) Appl. No.: 09/428,441

(22) Filed: Oct. 28, 1999

(51) Int. Cl.[7] ................................ F16H 3/38; F16H 3/40
(52) U.S. Cl. ........................................ 74/339; 192/53.361
(58) Field of Search ........................ 74/339; 192/53.361

(56) References Cited

U.S. PATENT DOCUMENTS

| | | | |
|---|---|---|---|
| 1,962,191 | * | 6/1934 | Griswold ............................. 192/53.3 |
| 2,174,148 | * | 9/1939 | Vincent ....................... 192/53.361 X |
| 2,369,848 | * | 2/1945 | Patterson ....................... 192/53.34 X |
| 4,192,410 | * | 3/1980 | Poirier ................................ 74/339 X |
| 4,430,904 | * | 2/1984 | Fogelberg ............................. 74/411.5 |
| 4,503,957 | * | 3/1985 | Ikemoto et al. ................ 74/411.5 X |
| 4,532,821 | * | 8/1985 | Hager ...................................... 74/370 |
| 4,836,041 | * | 6/1989 | Falzoni et al. .......................... 74/339 |
| 5,907,972 | * | 6/1999 | Del Sole .............................. 74/411.5 |

* cited by examiner

Primary Examiner—Allan D. Herrmann
(74) Attorney, Agent, or Firm—Richard A. Joel, Esq.

(57) ABSTRACT

A manual automobile transmission includes a non-rotating reverse gear having an internal spline in the front portion of the reverse gear and a needle roller bearing mounted at the rear portion. The bearing supports the gear and allows the main shaft to rotate without the gear turning when the transmission is not in the reverse mode. A separate splined collar is mounted on the shaft. Internal splines on the collar readily engage the splines on the main shaft and extended splines match the reverse gear splines. A small spring ball is inserted in the gear just forward of the splines to facilitate alignment of the gear and splined collar.

4 Claims, 3 Drawing Sheets

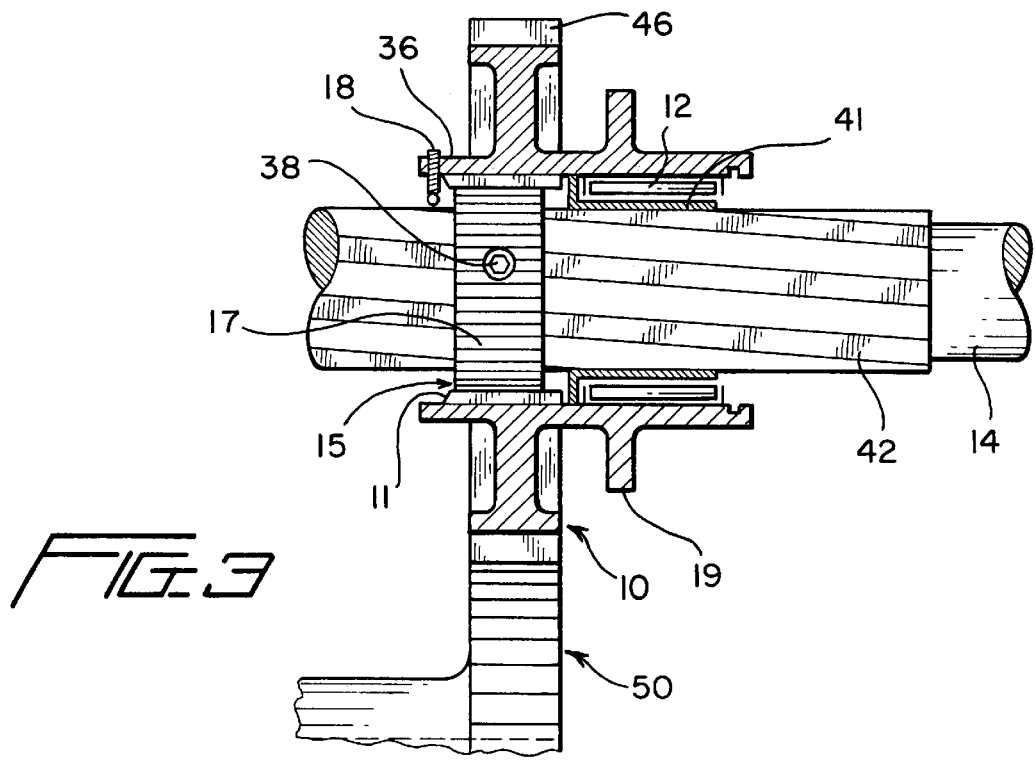
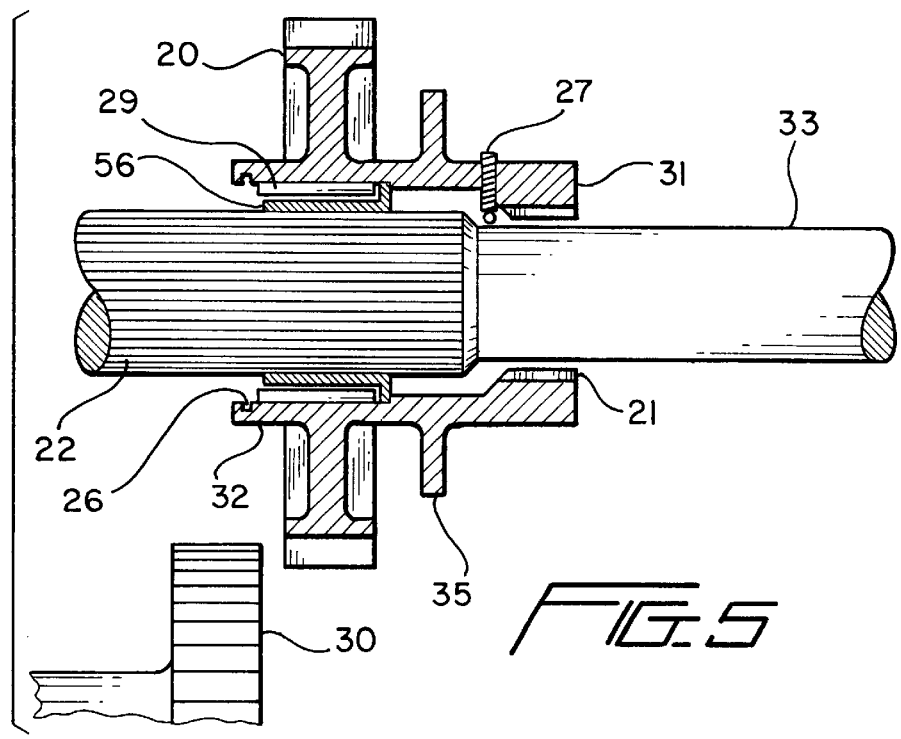

AUTOMOBILE TRANSMISSION WITH NON-ROTATING REVERSE GEAR

CROSS-REFERENCE TO RELATED APPLICATIONS

This application is an improvement on U.S. Pat. No. 5,907,972 which issued Jun. 1, 1999 and has common ownership with the present application.

STATEMENT REGARDING FEDERALLY SPONSORED RESEARCH OR DEVELOPMENT

Research and development of the present invention and application have not been Federally sponsored, and no rights are given under any Federal program.

BACKGROUND OF THE INVENTION

1. Field of the Invention

This invention relates to automobile and particularly racing car transmissions having manual transmissions with reverse gears.

2. Description of the Related Art Including Information Disclosed Under 37 CFR §§1.97–1.98

The following patents are cited as being of interest in the field to which the present invention pertains:

| U.S. PAT. NOS.: | | |
| --- | --- | --- |
| 4,192,410 | 4,436,904 | 4,503,957 |
| 4,532,821 | 4,836,041 | 5,907,972 |

Applicant's U.S. Pat. No. 5,907,972 discloses a racing car transmission with a non-rotating reverse gear. The gear does not rotate until it is shifted into the reverse mode. The main shaft splines are shortened to allow the reverse gear to free wheel. The main shaft is machined to accept a needle roller bearing so that the gear can be rotatable about the shaft when free wheeling. This is no longer required with applicant's new designs proposed herein.

U.S. Pat. No. 4,532,821 to HAGER discloses a transmission primarily designed for racing cars and includes a disclosure that the reverse gear is operational only as long as the clutch is depressed.

U.S. Pat. No. 4,836,041 to FALZONI, et al discloses a transmission which deactivates the reverse gear when not in use.

The remaining patents cited above relate generally to transmissions having reverse gears and were cited during the prosecution of applicant's earlier U.S. Pat. No. 5,907,972.

While, as in U.S. Pat. No. 5,907,972, the reverse gear does not rotate until the transmission is shifted into the reverse mode, the new designs proposed herein will allow anyone with limited mechanical background to install the proposed reverse gear in the transmission by simply removing the original standard gear and replacing it with the unique gear proposed herein. This results in a considerable savings in time and expense.

SUMMARY OF THE INVENTION

The present invention relates to manual transmissions and particularly to racing car transmissions having a non-rotating reverse gear during forward vehicle movement.

Applicant discloses a reverse gear with an internal spline in the front portion of the reverse gear and a needle roller bearing pressed in at the rear portion. The bearing supports the gear and allows the main shaft to rotate without the gear turning when the transmission is not in the reverse mode. A separate splined collar having internal and external splines is slipped onto and secured to the main shaft. The internal splines are the same as the main shaft and the external splines match the reverse gear splines. Using a splined collar allows the use of finer splines for easy engagement. To facilitate alignment of the gear and splined collar, a small spring ball is inserted in the gear just forward of the splines. This spring ball aligns the splines in the front of the gear with the splines on the collar as it engages the main shaft and the reverse idler gear.

An alternate embodiment of the invention comprises a gear with internal splines at the rear portion of the reverse gear which match the splines on the main shaft and the bearing housed in the front end and secured with a snap ring arrangement. The gear engages the main shaft splines from the back end of the splines. A spring ball located just forward of the splines in the reverse gear is used to align the splines in the gear and the main shaft for ease of meshing the gear and the main shaft. A bearing supports the gear and allows it to free wheel when the gear is not in the reverse mode. As the gear is shifted into the reverse mode, the main shaft splines engage first the reverse gear and then the reverse gear meshes with the reverse idler gear.

Accordingly, an object of this invention is to provide a new and improved transmission having a non-rotating reverse gear during forward operation.

Another object of this invention is to provide a new and improved manual transmission especially for racing cars wherein a new non-rotating reverse gear is provided which does not require modifying the main shaft of the transmission.

A further object of this invention is to provide a new and improved transmission wherein the reverse gear does not rotate until shifting into the reverse mode as a result of replacing the standard gear with said reverse gear in combination with a splined collar to engage the splines on the main shaft.

A more specific object of this invention is to provide a new and improved transmission wherein a new reverse gear and splined collar are utilized together with a spring ball for alignment.

BRIEF DESCRIPTION OF THE DRAWINGS

The above and other objects and advantages of this invention may be more clearly seen when viewed in conjunction with the accompanying drawings wherein:

FIG. 3 is a side cross-sectional view with the reverse gear in an engaged mode;

FIG. 5 is a side cross-sectional view of the embodiment of FIG. 4 of the reverse idler gear in a non-engaged state;

DETAILED DESCRIPTION OF THE INVENTION

Figure 1:
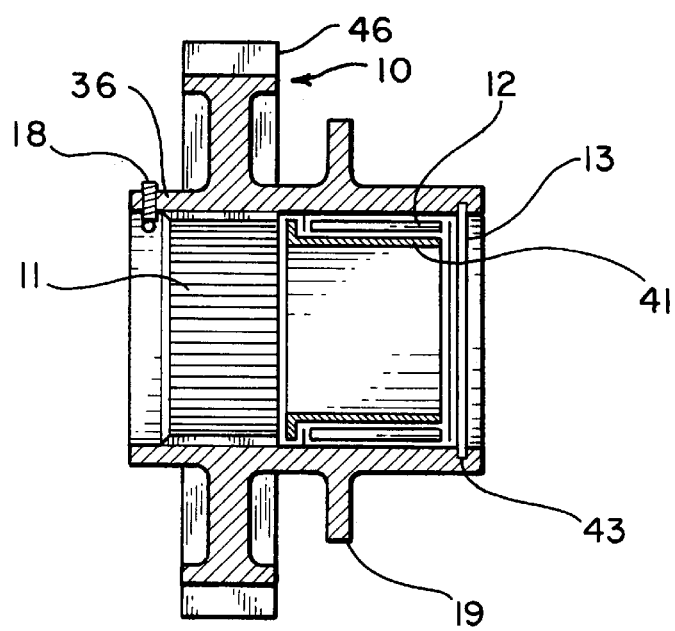
FIG. 1 is a side cross-sectional view of the transmission comprising the invention.
Figure 2:
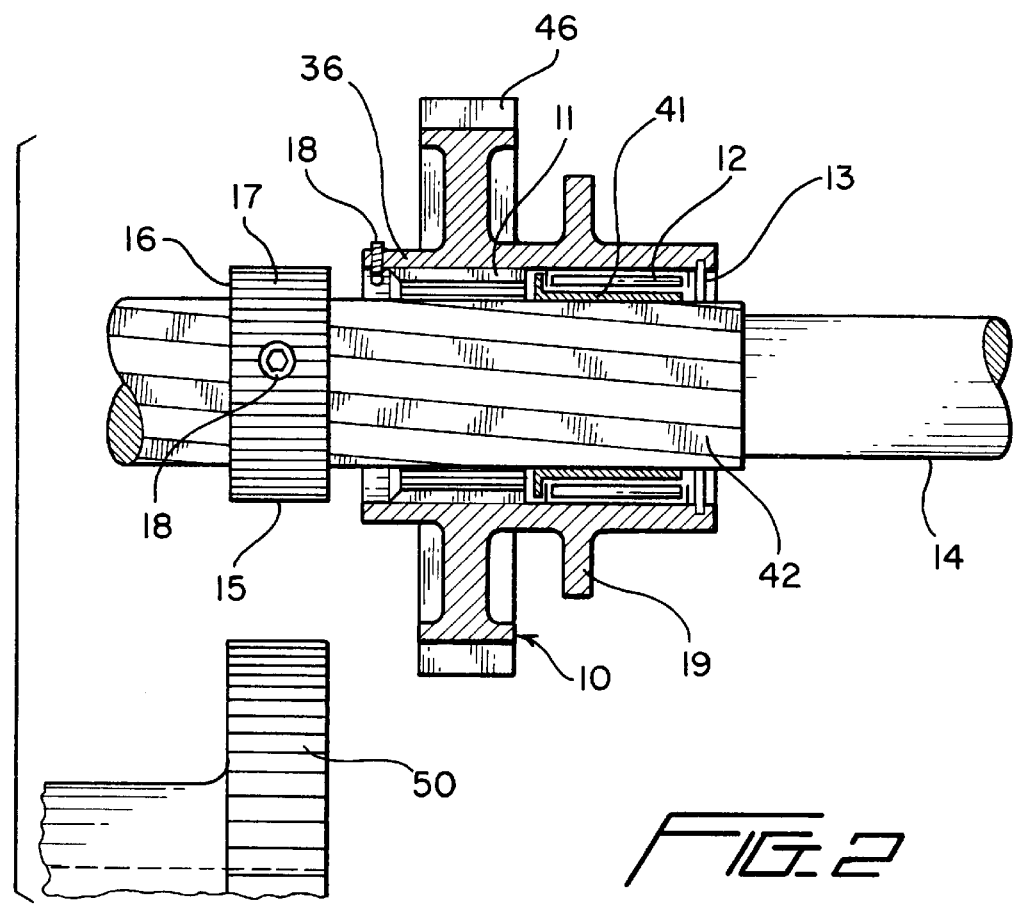
FIG. 2 is a side cross-sectional view showing the main shaft with a splined collar of the reverse idler gear in a non-engaged state.

Referring now to the drawings FIGS. 1–3 show a reverse gear 10 with teeth 46, an internal spline 11 in the front portion of the reverse gear 10 and a needle roller bearing 12 pressed in at the rear portion. A snap ring 13 is positioned in a groove 43 at the end of the bearing 12 to prevent the bearing 12 from coming out of the gear 10. This bearing 12 supports the gear 10 and allows the main shaft 14 to rotate without the gear turning when the transmission is not in the reverse mode.

FIG. 1 also shows an inner bearing sleeve 41 which rides on the shaft 14 and a groove 43 for the snap ring 13 which holds the bearing 12 in place. A spring-backed ball 18 is inserted through in the gear 10 just forward of the splines 11 to align the splines 11 in front of the gear 10 with the splines 17 on the collar 15 as it engages the main shaft 14 and the reverse idler gear 50.

The shifting flange is shown at 19.

A separate splined collar 15 consisting of internal and external splines 16 and 17 is slipped on the main shaft splines 42 and secured with three circumferentially spaced set screws 38. The internal splines 16 are the same as the main shaft 14 and the external splines 17 match the reverse gear spline 11. The reason for this type of set up is due to the coarse spline configuration on the main shaft 14. When the idler gear 50 is disengaged from the reverse gear 10 the reverse gear 10 does not rotate with the shaft 14.

Coarse splines are difficult to align when trying to mesh one with the other. This method of using a splined collar 15 allows the use of finer splines for easy engagement. To facilitate alignment of the gear 10 and splined collar 15, a small "spring ball" 18 is inserted through a flange portion 36 in the gear 10 just forward of the splines 11. This resiliently backed spring ball 18 aligns the splines 11 in the front of the gear 10 with the splines 17 on the collar 15 as it is slid forward by the shifting fork 19 to engage the main shaft 14 and the reverse idler gear 50. At other times. the reverse gear 10 will not rotate since the transmission in a forward mode. FIG. 2 depicts the reverse gear 10 in a free wheeling mode while FIG. 3 shows the gear 10 in an engaged position with the idler gear 50 engaging the reverse gear 10 and the collar 15 meshing with splines 11.

Thus. the transmission shaft 14 need not be modified to provide a non-rotating reverse gear 10 with its many advantages. This new design permits anyone with limited mechanical ability to rapidly install the new gear 10 in the transmission by simply removing the original gear and replacing it with gear 10.

Figure 4:
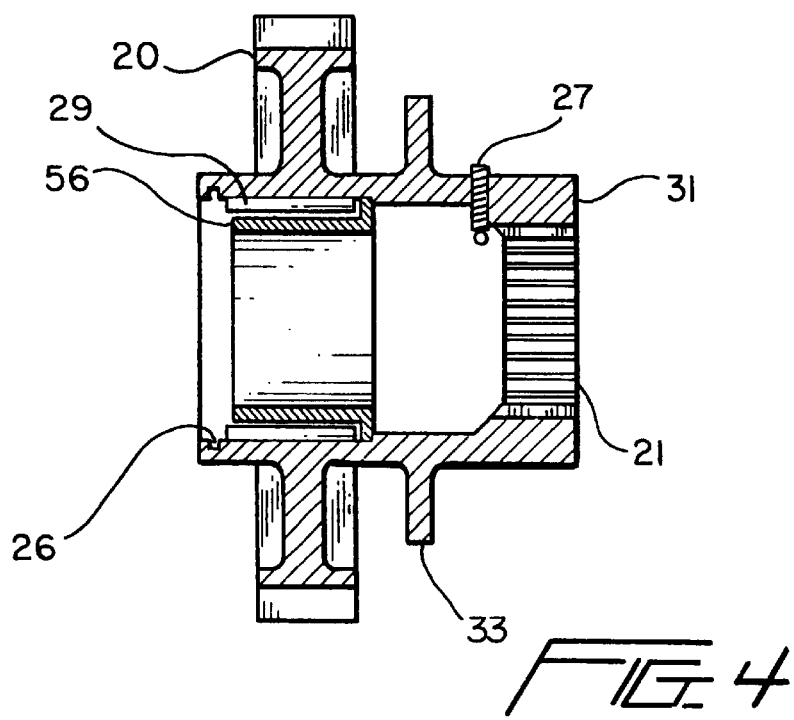
FIG. 4 is a side cross-sectional view of an alternate embodiment of the invention.
Figure 6:
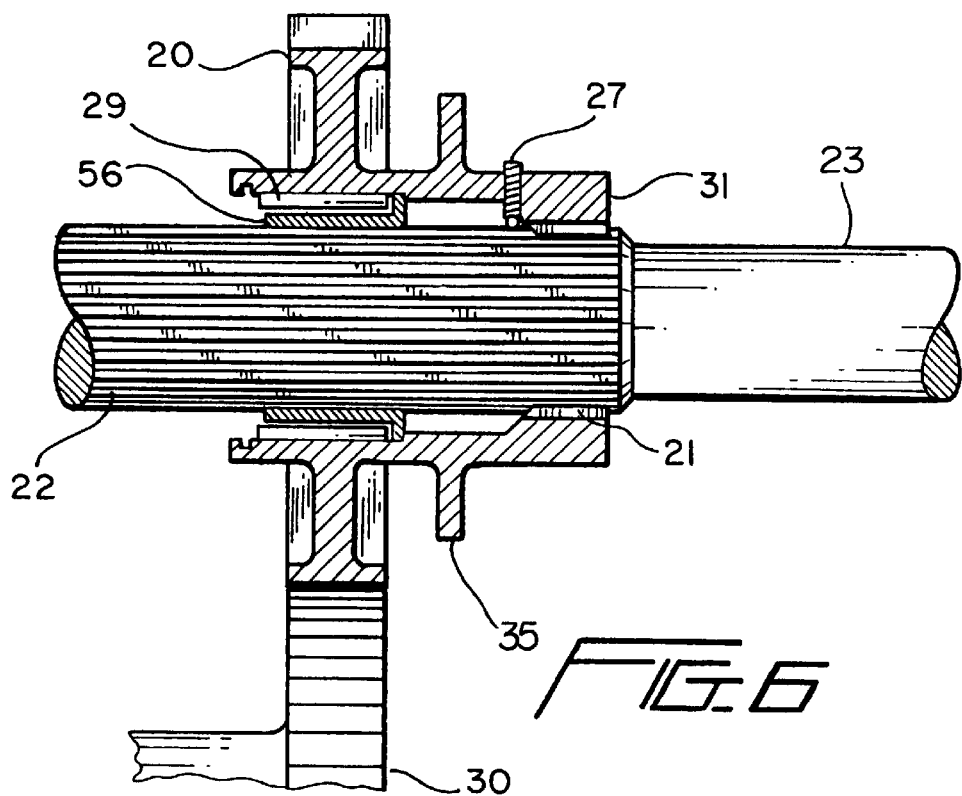
FIG. 6 is a view of the gear of FIG. 5 engaged with the main shaft and the reverse idler.

In the alternate embodiment of FIGS. 4, 5 and 6, a gear 20 is disclosed with internal splines 21 at the rear portion of the reverse gear 20 which match the splines 22 on the main shaft 23. A bearing 29 is housed in the front end 32 and secured with a similar snap ring arrangement 26. Also shown are an inner bearing sleeve 56 and a snap ring groove 26 to retain the bearing 29. This embodiment engages the main shaft splines 22 from the back end of the splines. This is made possible due to the fine spline configuration of the main shaft 23. A "spring ball" 27 located just forward of the splines 21 in the reverse gear 10 is used to align the splines 21 in the gear 10 and the splines 22 on the main shaft 23 to facilitate meshing the gear 10 and the main shaft 23. A bearing 29 similar to the previous embodiment supports the gear 10 and allows it to free wheel when the gear 10 is not in the reverse mode with the shifting flange 33. As the gear 10 is shifted into the reverse mode the main shaft splines 22 engage first the splines 21 of reverse gear 10 and then the reverse gear 10 meshes with the idler gear 30.

While the invention has been explained by a detailed description of certain specific embodiments, it is understood that various modifications and substitutions can be made in any of them within the scope of the appended claims which are intended also to include equivalents of such embodiments.

What is claimed is:

1. A racing car transmission including a main shaft having a reverse gear mounted thereon and a reverse idler gear mounted for engagement with the reverse gear comprising:

a main shaft having splines on the exterior surface thereof;

a splined collar mounted to the main shaft having a series of external splines and internal splines to engage the exterior splines on the shaft;

a reverse gear mounted on the main shaft having internal splines for engagement with the external splines on the collar;

a spring urged member mounted to the reverse gear for aligning the internal splines on the reverse gear with the external splines on the collar;

wherein the reverse gear is normally in a freewheeling mode during forward motion of the shaft and is moved into engagement with the reverse idler gear as the collar engages the internal splines on the reverse gear.

2. A racing car transmission including a main shaft having a reverse gear mounted thereon and a reverse idler gear mounted for engagement with the reverse gear in accordance with claim 1 further including:

a roller bearing mounted to the reverse gear to support the reverse gear and permit the main shaft to rotate without the reverse gear turning when the transmission is not in a reverse mode.

3. A racing car transmission including a main shaft having a reverse gear mounted thereon and a reverse idler gear mounted for engagement with the reverse gear in accordance with claim 1 wherein:

the splined collar comprises a plurality of fine external splines for easy engagement with the internal splines on the reverse gear.

4. A racing car transmission including a main shaft having a reverse gear mounted thereon and a reverse idler gear mounted for engagement with the reverse gear in accordance with claim 1 fiber including:

a plurality of setscrews and wherein the splined collar includes a plurality of apertures each engaged by a setscrew, said set screws extending through the apertures to each engage a spline on the main shaft.

* * * * *